US010200579B2

(12) United States Patent
Chang et al.

(10) Patent No.: US 10,200,579 B2
(45) Date of Patent: Feb. 5, 2019

(54) IMAGE CAPTURING DEVICE (71) Applicant: ABILITY ENTERPRISE CO., LTD., New Taipei (TW)

(72) Inventors: Yen-Min Chang, New Taipei (TW); Shih-Pin Wang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 15/185,509

(22) Filed: Jun. 17, 2016

(65) Prior Publication Data
US 2016/0373625 A1 Dec. 22, 2016

(30) Foreign Application Priority Data

Jun. 17, 2015 (TW) .............................. 104119538 A (51) Int. Cl.
*H04N 5/225* (2006.01)
*H04N 5/232* (2006.01)

(52) U.S. Cl.
CPC ....... *H04N 5/2252* (2013.01); *H04N 5/23293* (2013.01)

(58) Field of Classification Search
None
See application file for complete search history.

(56) References Cited

U.S. PATENT DOCUMENTS

| 6,369,849 | B1 * | 4/2002 | Rzyski | G02B 23/08 348/158 |
| 2006/0042391 | A1 * | 3/2006 | Georgeson | G01N 29/07 73/633 |
| 2006/0114986 | A1 * | 6/2006 | Knapp, II | A61B 1/00103 375/240.01 |
| 2014/0055596 | A1 * | 2/2014 | Hatcher, Jr. | B25J 9/065 348/82 |

FOREIGN PATENT DOCUMENTS

| CN | 2011-52920 Y | 11/2008 |
| CN | 2014-89190 U | 5/2010 |
| CN | 2019-65203 U | 9/2011 |
| CN | 104776302 A | 7/2015 |
| JP | 2012-045732 A | 3/2012 |

OTHER PUBLICATIONS

Chinese Office Action dated Aug. 31, 2018.

* cited by examiner

*Primary Examiner* — Mark T Monk
(74) *Attorney, Agent, or Firm* — Rabin & Berdo, P.C.

(57) ABSTRACT

An image capturing device is provided. The image capturing device includes a main body, an image capturing module and a rod. The image capturing module includes a lens and an image capturing unit. The main body includes a display module. The image capturing module is electrically connected to the main body. The rod is adjustably disposed between the image capturing module and the main body.

21 Claims, 6 Drawing Sheets

IMAGE CAPTURING DEVICE

This application claims the benefit of Taiwan application Serial No. 104119538, filed Jun. 17, 2015, the subject matter of which is incorporated herein by reference.

BACKGROUND OF THE INVENTION

Field of the Invention

The invention relates in general to an image capturing device, and more particularly to an image capturing device having a rod between a main body and an image capturing module.

Description of the Related Art

An image capturing device includes a lens structure and an image sensor. The lens structure is capable of focusing an image on the image sensor, and then the image sensor converts the optical image signals into electrical signals. Conventional image capturing device is held directly by user, or mounted directly on a tripod for capturing an image.

However, if the image capturing device is held by user, the image capturing range of the image capturing device will be restricted due to the limited arm's length of the user. In case that the image capturing device is mounted on a tripod, the image capturing device is fixed on the tripod during shooting. However, the tripod only can be fixed on the ground. Whether to adjust the shooting angles or the shooting ranges of the image capturing device, the user needs to come next the image capturing device to adjust again. Furthermore, the tripod needs to be stored additionally after shooting, so it is quite inconvenient.

Therefore, it is desired to provide a new image capturing device to increase the flexible application of the image capturing device.

SUMMARY OF THE INVENTION

The invention is directed to an image capturing device with a highly flexible application.

According to the present invention, an image capturing device is provided. The image capturing device includes a main body, an image capturing module and a rod. The image capturing module is electrically connected to the main body. The rod is adjustably disposed between the image capturing module and the main body.

According to another aspect of the present invention, an image capturing device is provided. The image capturing device includes a main body, an image capturing module and a rod. The image capturing module includes a lens and an image capturing unit. The main body includes a display module. The rod is disposed between the image capturing module and the main body.

According to still another aspect of the present invention, an image capturing device is provided. The image capturing device includes an image capturing module, a main body, and a rod. The image capturing module includes a lens and an image capturing unit. The main body includes a display module. The image capturing module is electrically connected to the main body. The rod is adjustably disposed between the image capturing module and the main body.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
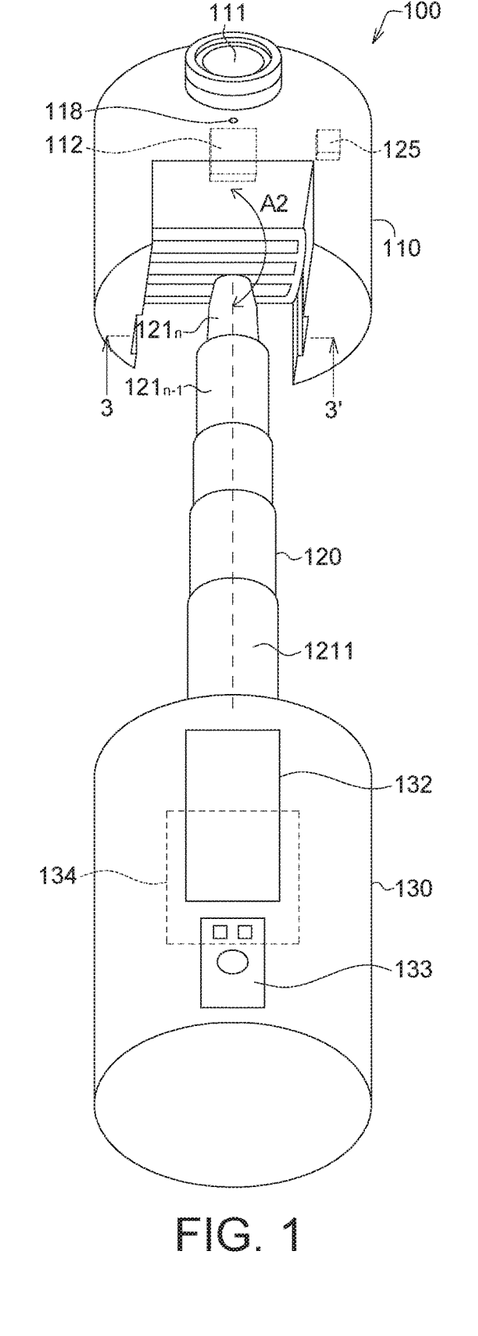
FIG. 1 is a schematic diagram of an image capturing device according to one embodiment of the present invention.

FIG. 1 is a schematic diagram of an image capturing device 100 according to one embodiment of the present invention. The image capturing device 100 includes an image capturing module 110, a rod 120 and a main body 130. The image capturing module 110 may be electrically connected to the main body 130. The rod 120 may be disposed between the image capturing module 110 and the main body 130. The distance between the main body 130 and the image capturing module 110 may be adjusted in accordance with the rod 120. Therefore, a rod 120 may be adjustably disposed between the image capturing module 110 and the main body 130.

As shown in FIG. 1, the image capturing module 110 may include a lens 111 and an image capturing unit 112. The image capturing unit 112 may capture an image through the lens 111. The image capturing unit 112 may be realized by a charge-coupled device (CCD) or a complementary metal-oxide-semiconductor (CMOS), but the present invention is not limited thereto. Besides, in another embodiment, the image capturing module 110 may further include a light emitting unit 118, which may provide supplementary lighting brightness when capturing an image.

In another aspect, the main body 130 may include an arithmetic unit 134 and/or a display module 132. In one embodiment, the main body 130 may further include a control module 133. The control module 133 may be used as the control center of the image capturing device, and may further command the arithmetic unit 134 to process the image from the image capturing unit 112. In another embodiment, the arithmetic unit 134 may meanwhile be used as the control center of the image capturing device, and may process the image from the image capturing unit 112. That is, the effect of the control module 133 may also be integrated into the arithmetic unit 134.

As shown in FIG. 1. In another embodiment, the image capturing module 110 may further include an angle detecting module 125. The angle detecting module 125 may detect the angle and/or the amount of change in relative angle between the image capturing module 110 and the rod 120. Further, the control module 133 and/or the arithmetic unit 134 may determine the relative position of at least one of the horizontal orientation, vertical orientation and gravity orientation of the captured image and the horizontal orientation and/or the vertical orientation of the display (not shown) of the display module 132 according to the angle and/or the amount of change in relative angle output from the angle detecting module 125. Next, the control module 133 and/or the arithmetic unit 134 may show the captured image on the display module 132 according to the result of the determination. The angle detecting module 125 may include elements capable of detecting orientation, such as but not limit to an acceleration detector and a gyro.

In still one embodiment, at least one of the image capturing module 110 and the main body 130 may further include a memory unit (not shown). In addition, the relative position of at least one of the horizontal orientation, vertical orientation and gravity orientation of the captured image and the horizontal orientation and/or the vertical orientation of the display (not shown) of the display module 132 may be stored in the memory unit.

In one embodiment, the rod 120 includes a plurality of sub-rods 1211-121n. Outer diameters of the sub-rods 1211-121n may be sequentially increasing or decreasing. For example, when the rod 120 is stretched and lengthened, outer diameters of the sub-rods farther from the main body 130 may be sequentially decreasing. For example, outer diameter of the sub-rod 121n connected to the image capturing module 110 is the smallest, while outer diameter of the sub-rod 1211 connected to the main body 130 is the largest. But the present invention is not limited thereto. In another embodiment, outer diameters of the sub-rods farther from the main body 130 may be sequentially increasing.

Figure 2:
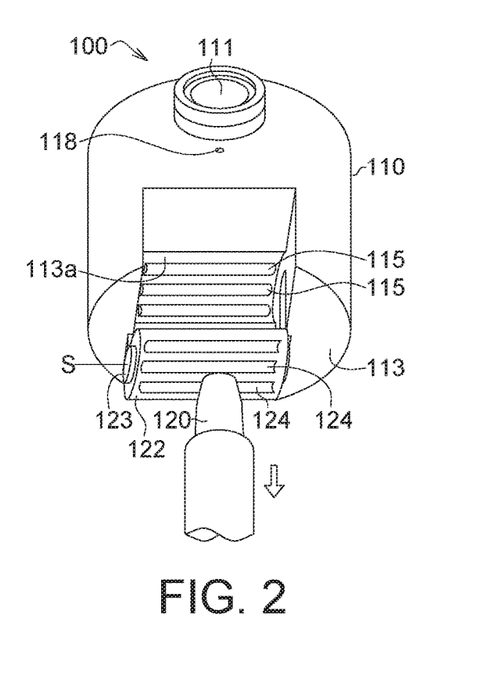
FIG. 2 is an expansion diagram of the image capturing device of FIG. 1.
Figure 3:
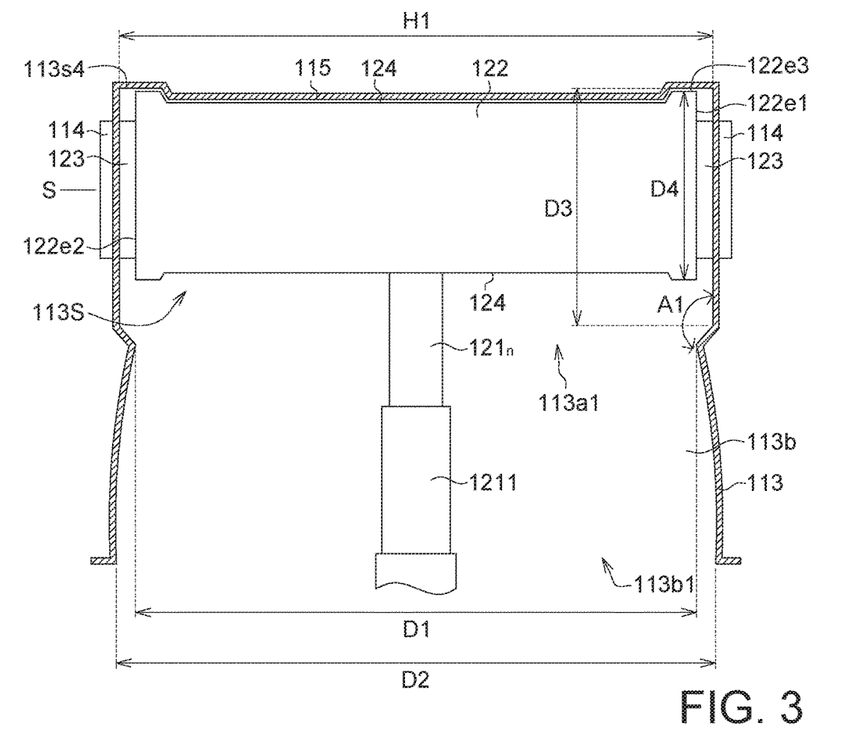
FIG. 3 is a partially cross-section view of the image capturing device of FIG. 1 along a direction 3-3'.
Figure 4:
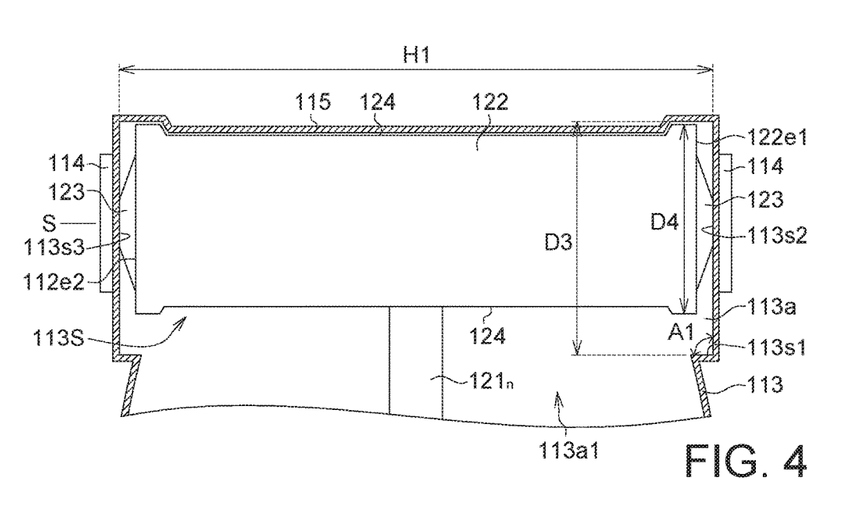
FIG. 4 is a partially cross-section view of an image capturing device along a direction 3-3' according to another embodiment.

FIG. 2 is an expansion diagram of the image capturing device 100 of FIG. 1. FIG. 3 is a partially cross-section view of the image capturing device 100 of FIG. 1 along a direction 3-3'. FIG. 4 is a partially cross-section view of an image capturing device 100 along a direction 3-3' according to another embodiment.

As shown in FIGS. 2-4, the rod 120 includes a first pivot 122 and two first fixing components 123. The first pivot 122 has a first end face 122e1 and a second end face 122e2. The first end face 122e1 and the second end face 122e2 may be disposed opposite. The two first fixing components 123 are respectively disposed on the first end face 122e1 and the second end face 122e2. The surface of the first fixing component 123 may be a plane, a curved surface or a slope. As shown in FIG. 3, the surface of the first fixing component 123 may be a plane. As shown in FIG. 4, the surface of the first fixing component 123 may be a slope.

As shown in FIGS. 2-4, the image capturing device 100 further includes a housing 113. The housing 113 includes a second pivot 113a. The image capturing module 110 is accommodated in the housing 113. Specifically, the second pivot 113a has a first side face 113s2 and a second side face 113s3. The first side face 113s2 and the second side face 113s3 may be disposed opposite. The housing 113 may be made of a material which has flexibility, toughness and/or elasticity. The material includes but does not limit to plastic, rubber, metal, or a material doped with at least one of plastic, rubber and metal.

In one embodiment, the rod 120 and the image capturing module 110 may be connected with the first pivot 122 and the second pivot 113a. In addition, the two first fixing components 123 may connect or engage with the first side face 113s2 and the second side face 113s3 of the second pivot 113a respectively. In another embodiment, the inner diameter of the second pivot 113a is larger than the inner diameter of the first pivot 122. For example, the third inner diameter D3 of the first side face 113s2 of the second pivot 113a is larger than the inner diameter D4 of the first pivot 122. In addition, the second pivot 113a further includes an accommodation space 113S. The first pivot 122 may be disposed inside the accommodation space 113S of the second pivot 113a, and may rotate relatively with the second pivot 113a in the accommodation space 113S.

As shown in FIGS. 3-4, the housing 113 further includes two second fixing components 114. The two second fixing components 114 may be disposed on the outer sides of the housing 113 or the second pivot 113a. In one embodiment, the second fixing components 114 are respectively disposed on the outsides of the housing 113 correspondingly opposite to the first side face 113s2 and the second side face 113s3 of the second pivot 113a. The two second fixing components 114 are further fixed to the two first fixing components 123 of the first pivot 122 inside the second pivot 113a respectively. In one embodiment, at least one of the first fixing component 123 and the second fixing component 114 is magnetic, so that the first fixing component 123 and the second fixing component 114 may be attracted with each other by a magnetic force. Thus, even if the housing 113 is disposed between the first fixing component 123 and the second fixing component 114, the first fixing component 123 and the second fixing component 114 can still fixed with each other. In one embodiment, one of the first fixing component 123 and the second fixing component 114 may be a material capable of producing a magnetic field, such as a material having ferromagnetism, which includes but does not limit to a magnet. The other may be a material having paramagnetism, such as a metal. Therefore, the first fixing component 123 and the second fixing component 114 may be attracted with each other. Alternatively, both of the first fixing component 123 and the second fixing component 114 may be a material capable of producing a magnetic field.

As shown in FIGS. 2-4, the second pivot 113a includes a first opening 113a1 and a first slope 113s1. The first slope 113s1 is disposed between the first side face 113s2 and the first opening 113a1. The first opening 113a1 has a first inner diameter D1, which is smaller than a first distance H1 between the two first fixing components 123. The housing 113 further includes a recess 113b connecting with the second pivot 113a. The recess 113b has a second opening 113b1 and a second inner diameter D2. The second inner diameter D2 of the present embodiment is a gradational inner diameter. For example, the inner diameter of the recess 113b gradually changes along a direction from the second opening 113b1 to the first opening 113a1 of the second pivot 113a. Specifically, the second inner diameter D2 is substantially larger than or equal to the first inner diameter D1.

Refer to FIGS. 2-4. In one embodiment, during the assembly of the first pivot 122 and the second pivot 113a, the first pivot 122 may be placed into the second pivot 113a sequentially from the second opening 113b1 through the recess 113b and the first opening 113a1. Furthermore, although the first inner diameter D1 is smaller than the first distance H1 between the two first fixing components 123, the housing 113 may be spread when the first pivot 122 enters the first opening 113a1 due to the flexibility, toughness and/or elasticity of the housing 113. Thus, the first pivot 122 and the second pivot 113a may assemble together. Accordingly, the first pivot 122 disposed inside the second pivot 113a will not come off easily in that the first inner diameter D1 is smaller than the first distance H1 between the two first fixing components 123.

Furthermore, in one embodiment, the second pivot 113a of the housing 113 has the first slope 113s1, the first side face 113s2 and a first angle A1 between the first slope 113s1 and the first side face 113s2. The first angle A1 may be larger than or substantially equal to 90 degrees. For example, in FIG. 3, the first angle A1 may be larger than 90 degrees. In FIG. 4, the first angle A1 may be substantially equal to 90 degrees.

In one embodiment, when the first pivot 122 is accommodated inside the second pivot 113a, the first pivot 122 and the second pivot 113a will not come off naturally due to the first angle A1 formed between the first slope 113s1 and the first side face 113s2. When it is desired to disassemble the first pivot 122 from the second pivot 113a, the first pivot 122 may be separated from the second pivot 113a in accordance with the guide of the first slope 113s1.

As shown in FIGS. 2-4, the rod 120 includes at least one first engager 124. The housing 113 includes at least one second engager 115. The first pivot 122 has a top surface 122e3, and the second pivot 113a has a bottom surface 113s4. The top surface 122e3 is disposed between the first end face 122e1 and the second end face 122e2 correspondingly opposite to the first end face 122e1. The first engager 124 is disposed on the top surface 122e3. The bottom surface 113s4 is correspondingly opposite to the first opening 113a1, and disposed between the first side face 113s2 and the second side face 113s3. The second engager 115 is disposed on the bottom surface 113s4. When each second engager 115 engages with each of the corresponding first engager 124 respectively, the top surface 122e3 of the first pivot 122 is opposite to the bottom surface 113s4 of the second pivot 113a. In one embodiment, the first engager 124 is a concave part, while the second engager 115 is a convex part. In another embodiment, the first engager 124 may be a convex part, while the second engager 115 may be a corresponding concave part. In addition, the convex part and the concave part may be an arbitrary shape, such as a long bar or a dot shape, while the shape of the concave part may correspond to the convex part. The number of the first engager 124 and the second engager 115 may be respectively one and/or plural.

As shown in FIGS. 1-4, if the number of the first engager 124 and the second engager 115 is plural, the first engagers 124 and the second engagers 115 arrange around a center axis S of the first pivot 122 respectively. When the first pivot 122 and the second pivot 113a rotate relatively with each other, the first engagers 124 and the second engagers 115 may be engaged and a second angle A2 between the image capturing module 110 and the rod 120. Further, the second angle A2 between the rod 120 and the image capturing module 110 is fixed in accordance with the first engager 124 and the second engager 115 engaged with each other. Due to the plurality of the first engagers 124 disposed on the first pivot 122 and the plurality of the second engagers 115 disposed on the second pivot 113a respectively, multi-angles of the second angle A2 between the rod 120 and the image capturing module 110 in accordance with the first engagers 124 and the second engagers 115 engaged with each other. Further, the first engagers 124 may be disposed surroundingly on the first pivot 122 at an equal interval, and the second engagers 115 may also be disposed surroundingly on the second pivot 113a at an equal interval.

Figure 5:
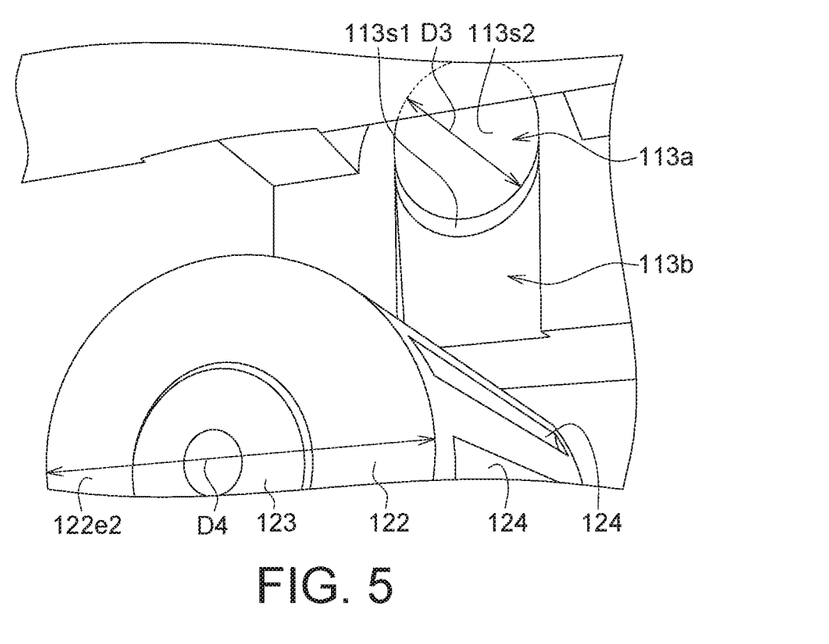
FIG. 5 is a schematic diagram illustrating that a first fixing component and a second pivot of FIG. 2 are separated from each other.
Figure 6A:
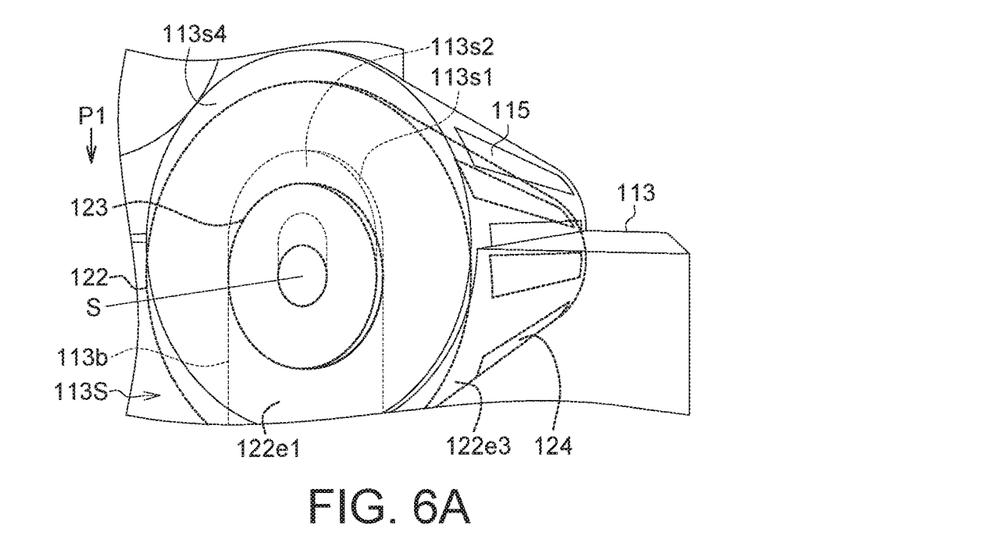
FIG. 6A is a schematic diagram illustrating that a rod and an image capturing module are separated from each other.
Figure 6B:
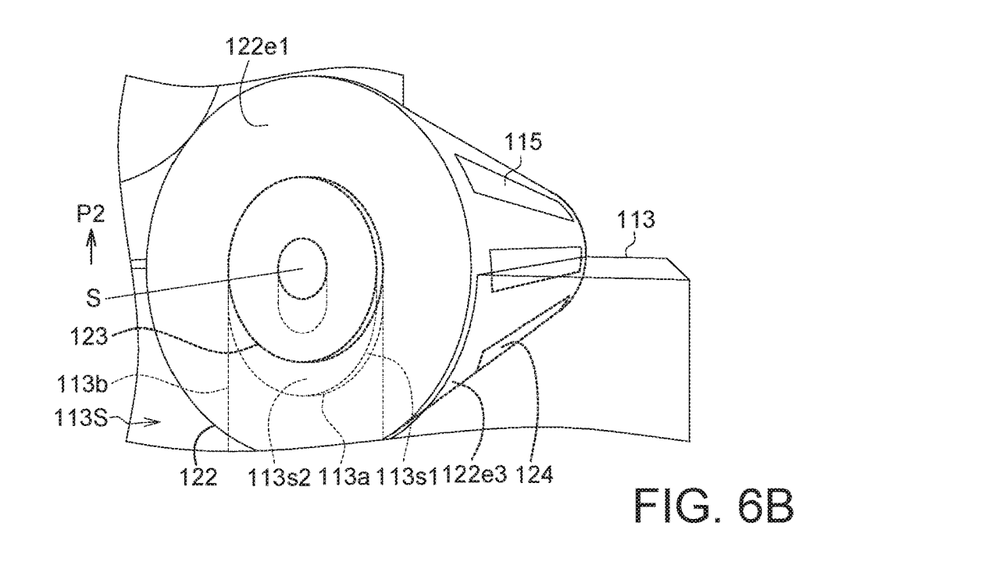
FIG. 6B is a schematic diagram illustrating that the rod and the image capturing module are connected with each other.

FIG. 5 is a schematic diagram illustrating that the first fixing component 123 and the second pivot 113a of FIG. 2 are separated from each other. FIG. 6A is a schematic diagram illustrating that the rod 120 and the image capturing module 110 are separated from each other. FIG. 6B is a schematic diagram illustrating that the rod 120 and the image capturing module 110 are connected with each other.

As shown in FIGS. 5-6B, the second pivot 113a includes the accommodation space 113S, so that the first pivot 122 of the rod 120 may move along a direction towards the first opening 113a1 (i.e., the first direction P1), so as to release the fixing relationship of the first fixing component 123 and the second fixing component 114 (illustrated in FIG. 3). Thereafter, the rod 120 and the image capturing module 110 may relatively rotate around the center axis S, so as to adjust the magnitude of the second angle A2 between the rod 120 and the image capturing module 110. After the adjustment of the magnitude of the second angle A2 is completed, the rod 120 is pushed along a direction towards the second pivot 113a (i.e., the second direction P2), so that each first engager 124 of the first pivot 122 engages with a corresponding second engager 115. Thus, the second angle A2 between the rod 120 and the image capturing module 110 remains at a fixed angle. In addition, the rod 120 and the image capturing module 110 may also be connected with each other more steadily in accordance with the engagement of the first fixing component 123 and the second fixing component 114.

Besides, as shown in FIG. 5, the first side face 113s2 is an elongated shape, such as an ellipse; however, it may also be but not limit to a rectangle. In another aspect, the first fixing component 123 is a circle, for example; however, it may also be a rectangle or a square. The embodiments of the present invention are not limited to the shape of the first side face 113s2 and/or the first fixing component 123, as long as the first side face 113s2 may be provided for the second pivot 113a to form the accommodation space 113S.

Furthermore, the structure of the second side face 113s3 is similar to that of the first side face 113s2, and the connecting relationship of the second side face 113s3 and the first fixing component 123 is similar to that of the first side face 113s2 and the first fixing component 123, so they are not repeated here.

Figure 7:
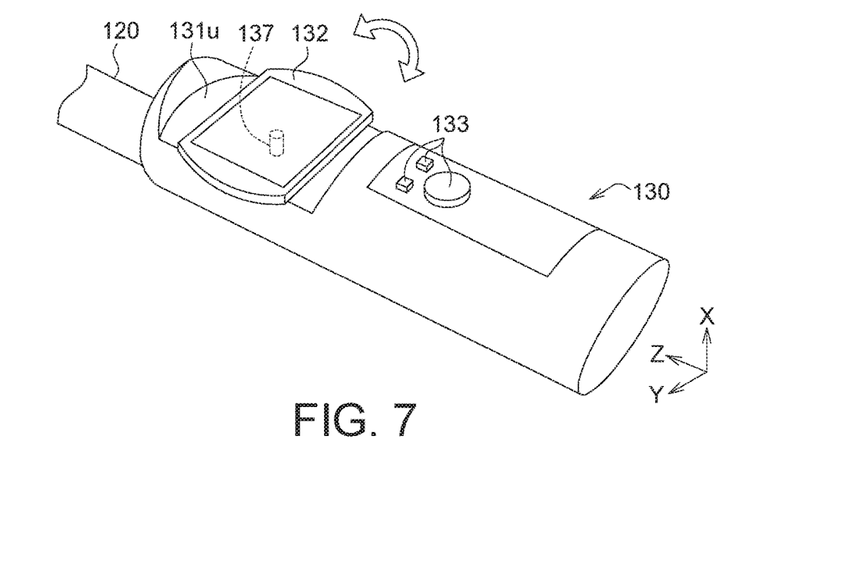
FIG. 7 is a schematic diagram of a main body of the present invention.

FIG. 7 is a schematic diagram of the main body of the present invention. The present embodiment exemplifies the control module 133 and the display module 132 further disposed on the main body 130. The main body 130 may further be a grip shape, and the shape may be a cylinder. The display module 132 displays the image captured by the lens 111 of the image capturing module 110. The captured image may be shown by the display module 132. Before the display module 132 displays the image, the image may be processed by the arithmetic unit 134 and/or the control module 133. Furthermore, the main body 130 may further include a communication unit (not shown). The communication unit may electrically connect the image capturing device 100 and other electronic devices, and/or transmit and receive information between the image capturing device 100 and other electronic devices.

In one embodiment, the image capturing device 100 may further control the display module 132 and/or the image capturing module 110 by the control module 133. The control module 133 may be disposed on the main body 130, and may electrically connect with the arithmetic unit 134 and/or the display module 132. The control module 133 includes at least one mechanical controller and/or at least one electrical controller, which include but not limit to a shutter key, a function key, a setup key, a selection key, etc. The electrical controller may also be realized in accordance with the display module 132. That is, the display module 132 may include a touch panel. The electrical controller receives an external control command in accordance with the touch panel. Furthermore, the image capturing device 100 may also control the image capturing module 110 via wired or wireless means. If the wired means is used, an electric wire (not shown) may be disposed in the rod 120 which is electrically connected between the image capturing module 110 and the main body 130. If the wireless means is used, the main body 130 may control the image capturing module 110 by Bluetooth or WiFi technology. But the present invention is not limited thereto.

As shown in FIG. 7, the main body 130 has a bearing surface 131u. The display module 132 may be placed on the bearing surface 131u and movable relatively with the main body 130. Specifically, the main body 130 may further include a third pivot 137 which is disposed on the bearing surface 131u and pivotally connects the display module 132 to the main body 130, so that the display module 132 and the main body 130 may relatively rotate, flip over, or move. In one embodiment, the third pivot 137 has an axial direction (not shown) substantially perpendicular to the bearing surface 131u, so that the display module 132 may rotate on the bearing surface 131u. But the present invention is not limited thereto. The third pivot 137 may have a plurality of rotating axes as well, so that the display module 132 and the main body 130 may relatively rotate, flip over, or move. The third pivot 137 may be realized by a pivot or a hinge.

Figure 8:
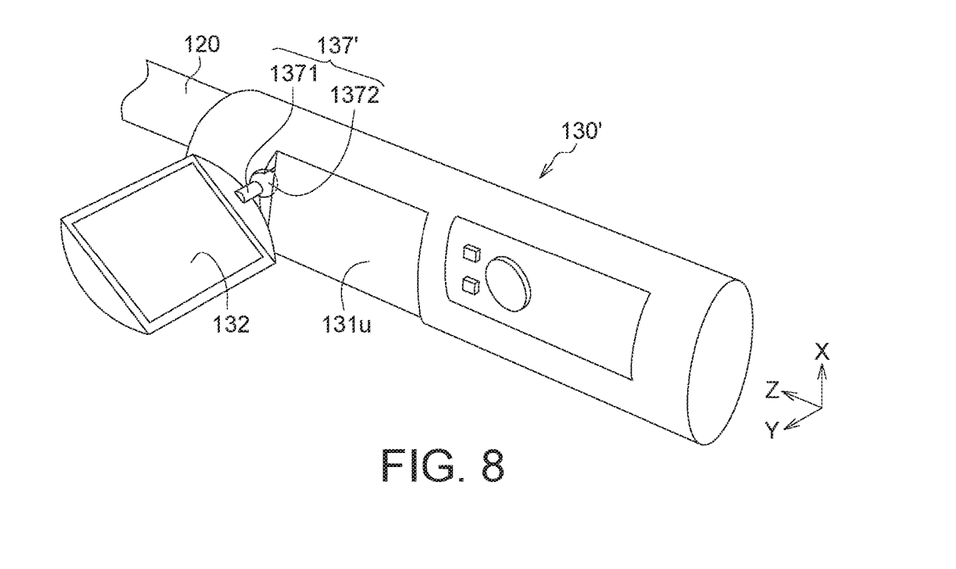
FIG. 8 is a schematic diagram of a main body of another embodiment of the present invention.

FIG. 8 is a schematic diagram of a main body 130' of another embodiment of the present invention. The third pivot 137' is realized by a ball socket, so that the display module 132 and the main body 130 may relatively rotate around x, y, and z axes. The z axis may be an extending direction of the rod 120, while the y axis may be a normal direction of the bearing surface 131u. The third pivot 137' includes a first connecting member 1371 and a second connecting member 1372 which are a columnar structure and a sphere respectively. The second connecting member 1372 is disposed at one end of the first connecting member 1371. Specifically, the first connecting member 1371 may pivotally connect to the display module 132, while the second connecting member 1372 may pivotally connect to the main body 130, so that the display module 132 may be movably connected to the main body 130 in accordance with the third pivot 137'.

Furthermore, the third pivot 137' may be pivotally disposed between any corner, edge, or any place of the bearing surface 131u and the main body 130. Thus, the third pivot 137' may move the display module 132 outside the bearing surface 131u. In another aspect, the third pivot 137' may also be pivotally disposed between one border of the display module 132 and the main body 130, so that the display module 132 may rotate around a direction substantially parallel to the z axis from the main body 130 by the third pivot 137', and then move along a direction substantially parallel to the y axis to the outside of the bearing surface 131u (not shown). The display module 132 may also move along the direction substantially parallel to the y axis to the outside of the bearing surface 131u at first, and then rotate around the direction substantially parallel to the z axis, of course.

The present invention is not limited to the type of the third pivots 137 and 137', as long as the display module 132 may have at least one degree of freedom relative to the main body 130 in accordance with the third pivots 137 and 137'.

Figure 9:
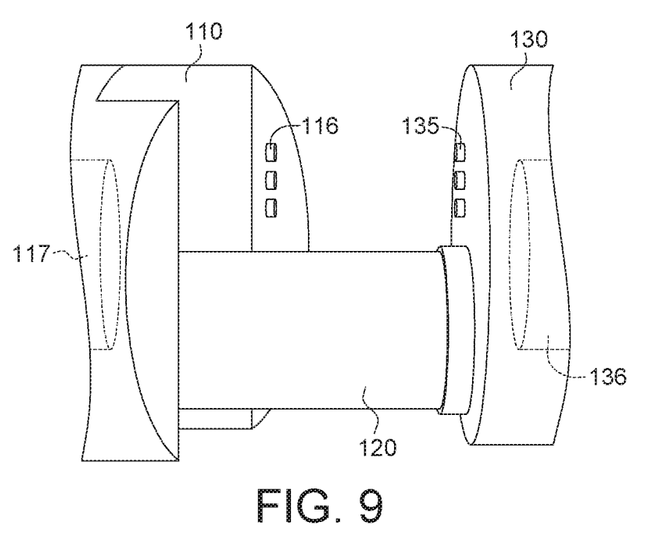
FIG. 9 is a partially enlarged view illustrating the image capturing device among the image capturing module, the rod and the main body.

FIG. 9 is a partially enlarged view illustrating the image capturing device 100 among the image capturing module 110, the rod 120 and the main body 130 of FIG. 1. In one embodiment, the main body 130 and the image capturing module 110 may further respectively include at least one contact and a power module. For example, the main body 130 includes at least one first contact 135 and a first power module 136 electrically connected with each other. The image capturing module 110 includes at least one second contact 116 and a second power module 117 electrically connected with each other. The first contact 135 and the second contact 116 may electrically connect with each other. When the image capturing module 110 and the main body 130 are at a collapsible state due to the receiving of the rod 120, the first contact 135 and the second contact 116 may electrically contact with each other. Further, the first power module 136 and the second power module 117 may be electrically connected and charged mutually with the first contact 135 and the second contact 116. The first power module 136 and the second power module 117 may respectively be a primary battery or a repeatedly rechargeable cell.

Furthermore, the image capturing module 110 and/or the main body 130 may further include a connection port (not shown). An external power may charge the second power module 117 of the image capturing module 110 and/or the first power module 136 of the main body 130 in accordance with the connection port.

According to the above, the relative distance between the image capturing module 110 and the main body 130 may be adjusted in accordance with the rod 120, and thus the usability of the image capturing device 100 may be enhanced. In another aspect, because the image capturing module 110 and the main body 130 are connected with each other by the rod 120, the image capturing module 110, the rod 120 and the main body 130 may be carried together, so that the image capturing device 100 possesses portability.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing device, comprising:
   a main body;
   a housing;
   an image capturing module accommodated in the housing and electrically connected to the main body; and
   a rod adjustably disposed between the image capturing module and the main body;
   wherein the rod and the image capturing module are separably connected with each other, the rod comprises at least one first engager and a first pivot, the housing comprises at least one second engager and a second pivot, the at least one first engager is disposed on a surface of the first pivot and arranged around a center axis of the first pivot, the at least one second engager is disposed on a surface of the second pivot, and an angle between the rod and the image capturing module is fixed by the at least one first engager and the at least one second engager being engaged.

2. The image capturing device according to claim 1, wherein the rod and the housing are connected with the first pivot and the second pivot, the first pivot and the second pivot are rotatable relative with each other, the second pivot comprises an accommodation space, and the first pivot is disposed inside the accommodation space.

3. The image capturing device according to claim 1, wherein the rod comprises a first fixing component, the housing comprises a second fixing component, and at least one of the first fixing component and the second fixing component is magnetic.

4. The image capturing device according to claim 1, wherein the main body comprises at least one first contact and a first power module, the image capturing module comprises at least one second contact and a second power module, and the first power module and the second power module are electrically connected with the first contact and the second contact.

5. The image capturing device according to claim 1, wherein the rod comprises a plurality of sub-rods, and outer diameters of the sub-rods are sequentially increasing or decreasing.

6. The image capturing device according to claim 1, wherein the housing has a first slope, a first side face and a first angle between the first slope and the first side face.

7. The image capturing device according to claim 1, further comprising a control module, wherein the control module has at least one mechanical controller and/or at least one electrical controller.

8. The image capturing device according to claim 1, wherein the second engager is arranged around the center axis of the first pivot.

9. The image capturing device according to claim 1, wherein the rod comprises a plurality of the first engagers, and the first engagers are separated from each other.

10. The image capturing device according to claim 1, wherein the rod comprises a plurality of the first engagers, the housing comprises a plurality of the second engagers, while one of the first engagers and one of the second engagers are engaged, the angle between the rod and the image capturing module has a first value, and while another of the first engagers and the one of the second engagers are engaged, the angle between the rod and the image capturing module has a second value, wherein the first value is different from the second value.

11. An image capturing device, comprising:
a housing;
an image capturing module accommodated in the housing and comprising a lens and an image capturing unit;
a main body comprising a display module;
a rod disposed between the image capturing module and the main body;
wherein the rod and the image capturing module are separably connected with each other, the rod comprises at least one first engager and a first pivot, the housing comprises at least one second engager and a second pivot, the at least one first engager is disposed on a surface of the first pivot and arranged around a center axis of the first pivot, the at least one second engager is disposed on a surface of the second pivot, and an angle between the rod and the image capturing module is fixed by the at least one first engager and the at least one second engager being engaged.

12. The image capturing device according to claim 11, wherein the main body further comprises a third pivot, and the display module is disposed on the main body in accordance with the third pivot.

13. The image capturing device according to claim 11, wherein the rod and the housing are connected with the first pivot and the second pivot.

14. The image capturing device according to claim 11, wherein the rod comprises a first fixing component, the housing comprises a second fixing component, and at least one of the first fixing component and the second fixing component is magnetic.

15. The image capturing device according to claim 11, wherein the main body comprises at least one first contact and a first power module, the image capturing module comprises at least one second contact and a second power module, and the first power module and the second power module are electrically connected with the first contact and the second contact.

16. The image capturing device according to claim 11, wherein the rod comprises a plurality of sub-rods, and outer diameters of the sub-rods are sequentially increasing or decreasing.

17. The image capturing device according to claim 11, wherein the housing has a first slope, a first side face and a first angle between the first slope and the first side face.

18. The image capturing device according to claim 11, further comprising a control module, wherein the control module has at least one mechanical controller and/or at least one electrical controller.

19. The image capturing device according to claim 11, wherein the second engager is arranged around the center axis of the first pivot.

20. The image capturing device according to claim 11, wherein the rod comprises a plurality of the first engagers, and the first engagers are separated from each other.

21. The image capturing device according to claim 11, wherein the rod comprises a plurality of the first engagers, the housing comprises a plurality of the second engagers, while one of the first engagers and one of the second engagers are engaged, the angle between the rod and the image capturing module has a first value, and while another of the first engagers and the one of the second engagers are engaged, the angle between the rod and the image capturing module has a second value, wherein the first value is different from the second value.

* * * * *